United States Patent [19]

Georger

[11] Patent Number: 5,389,900
[45] Date of Patent: Feb. 14, 1995

[54] ADAPTER FOR TRANSMISSION OF COLOR COMPONENTS ON SEPARATE TWISTED WIRE PAIRS

[75] Inventor: William H. Georger, Dover Township, Ocean County, N.J.

[73] Assignee: AT&T Corp., Murray Hill, N.J.

[21] Appl. No.: 37,944

[22] Filed: Mar. 26, 1993

[51] Int. Cl.[6] .............................. H03H 5/00
[52] U.S. Cl. ............................ 333/25; 333/4
[58] Field of Search .................. 333/1, 4, 5, 25, 26

[56] References Cited

U.S. PATENT DOCUMENTS 4,717,896  1/1988  Graham ................... 333/25
5,130,793  7/1992  Bordry et al. .
5,172,413  12/1992  Bradley et al. .

FOREIGN PATENT DOCUMENTS 2243038  10/1991  United Kingdom ........... 333/25

OTHER PUBLICATIONS

Amulet Electronics Product Literature for RGB Video Balun.
Systimax ® Premises Distribution System Components Guide, AT&T Doc. No. 3726C (Dec. 1990), pp. 3–10.

Primary Examiner—James J. Groody
Assistant Examiner—Cheryl Cohen
Attorney, Agent, or Firm—Lester H. Birnbaum

[57] ABSTRACT

Disclosed is an adapter which permits transmission of red, green and blue video signals over separate unshielded twisted wire pairs. Crosstalk is minimized by wideband video chokes coupled to each signal input/output.

7 Claims, 1 Drawing Sheet

ADAPTER FOR TRANSMISSION OF COLOR COMPONENTS ON SEPARATE TWISTED WIRE PAIRS

BACKGROUND OF THE INVENTION

This invention relates to transmission of video signals over twisted wire pairs.

There is a present and future need to bring video signals to the desk in office environments. Rather than install new wiring or optical fiber cables, it is desirable to transmit the video signals over twisted wire pair cables which already exist in the structure and are presently used for telephone transmission, as in AT&T's Systimax ® Premises Distribution System.

In applications where high resolution is required, for example, in transmitting stock quotations, it is usually necessary to transmit red, green and blue components of the video signal over separate wire pairs. However, crosstalk can be a significant problem. Further, common mode signals induced on the cable can create unacceptably high radiation emissions.

Recent proposals have suggested transmitting composite video signals over a twisted wire pair using active components to compensate for phase delays. (See, e.g., U.S. Pat. No. 5,130,793 issued to Bordry et al., and U.S. Pat. No. 5,172,413 issued to Bradley et al.) However, it should be more economical to couple video signals in a "passive" rather than an "active" manner, as described in U.S. patent application of Georger and Rutkowski, Ser. No. 07/943,644, filed Sep. 11, 1992 and assigned to the present assignee.

Transmission of red, green, and blue signals on separate twisted wire pairs has also been suggested. (See Amulet Electronics Product Literature for RGB Video Balun.) However, it does not appear that the problems of crosstalk and common mode signal suppression have been previously addressed.

SUMMARY OF THE INVENTION

The invention is a device for applying separate color components of a video signal on separate twisted pairs of wires. The device comprises a plurality of first ports, each adapted for coupling to a separate one of the color components. A transformer is coupled to each port, each transformer exhibiting a high degree of balance. A second port is also provided which is electrically coupled to each transformer, the second port including means for electrically connecting each transformer to a separate twisted wire pair.

BRIEF DESCRIPTION OF THE DRAWING

These and other features of the invention are delineated in detail in the following description. In the drawing.

DETAILED DESCRIPTION

Figure 1:
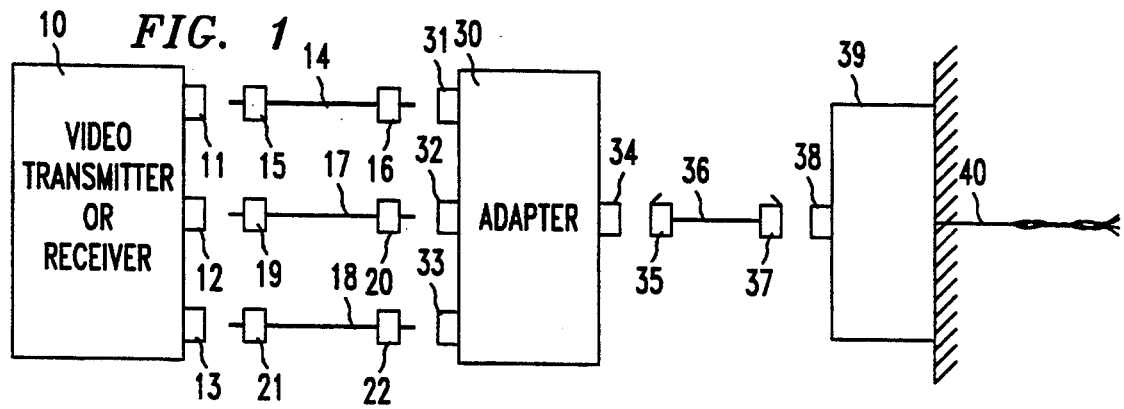
FIG. 1 is a block diagram of a system including the device according to one embodiment of the invention.

FIG. 1 illustrates the use of an adapter to permit transmission of separate color components of a video signal, typically red, green and blue, over separate twisted pairs of wires. A color video transmitter or receiver, 10, such as an RGB generator or monitor includes three inputs/outputs, 11, 12, and 13, for three separate channels, each channel carrying a different color component. Each input/output, 11, 12 and 13, is electrically coupled to a corresponding standard coaxial cable, 14, 17 and 18, respectively.

Each coaxial cable is terminated by standard BNC plugs. Thus, cable 14 is terminated by plugs 15 and 16, cable 17 is terminated by plugs 19 and 20, and cable 18 is terminated by plugs 21 and 22.

Figure 2:
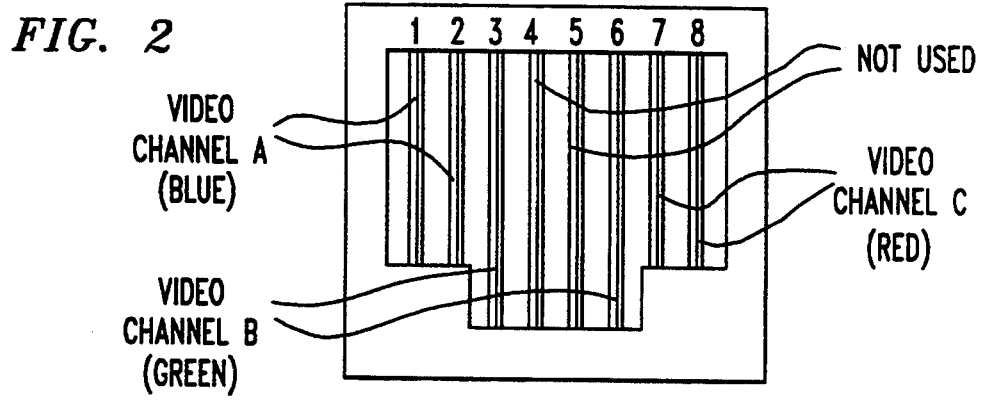
FIG. 2 is a schematic diagram of one portion of the device according to the same embodiment.

An adapter 30 includes a first set of ports, 31, 32, and 33, which are standard receptacles for receiving and electrically engaging the plugs 16, 20 and 22 of the cables 14, 17 and 18. At the other end of the adapter is an output port, in this example a single modular jack 34, which is adapted for receiving and electrically engaging a standard modular plug 35. That is, the modular jack 34 includes at least three pairs of electrical pins, each pair coupled to one of the input ports, 31–33. In this example, a standard 8-pin modular jack is employed with the pin layout illustrated in FIG. 2. As shown, the first two pins (1 and 2) are used for the blue component, while pins 3 and 6 are used for the green component. Pins 7 and 8 are used for the red component. The choice of coupling a particular component to a particular pin pair is described in further detail below. Pins 4 and 5, normally used for voice transmission, are not used by the adapter.

Cord 36, which can be a standard unshielded twisted pair cord containing at least three twisted pairs, includes standard plugs 35 and 37 at opposite ends. Plug 35 mates with jack 34 of the adapter. The plug 37 mates with a modular jack 38 which is part of the information outlet 39 mounted to the wall of a building. This information outlet couples the video components onto separate twisted pairs of a four-pair cable, 40, which runs throughout the building. The information outlet 39 is a standard part of an AT&T Systimax ® Premises Distribution System. (See, for example, *Systimax ® Premises Distribution System Components Guide*, AT&T Doc. No. 3726C (December 1990), p. 3–10.)

Figure 3:
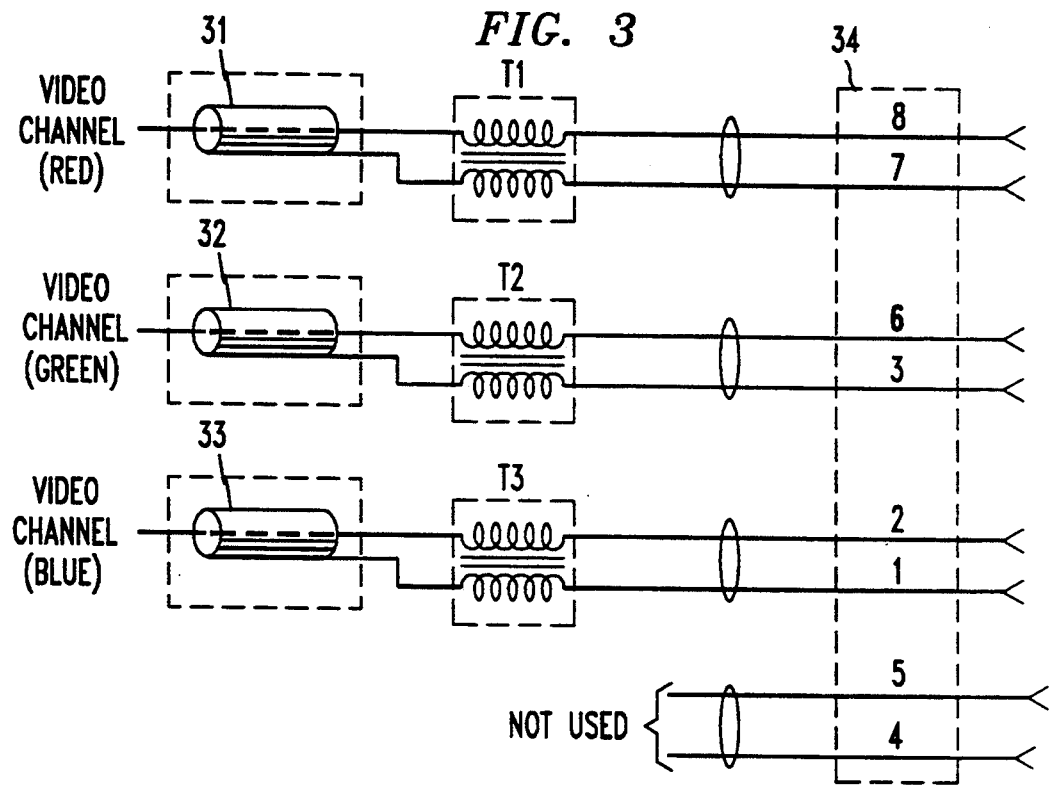
FIG. 3 is a schematic circuit diagram of the device in accordance with the same embodiment of the invention.

The adapter 30 is shown in more detail in the circuit schematic diagram of FIG. 3. The ports 31, 32, and 33 which receive, respectively, the red, green and blue components comprise in this embodiment standard BNC female coaxial connectors. However, any suitable connectors could be employed. The signal portion of the connector 31 is coupled to one end of the primary winding of a first transformer, $T_1$, while the ground portion of the connector is coupled to one end of the secondary winding of transformer $T_1$. The opposite ends of the windings are coupled to the appropriate pins (7 and 8) of the modular jack 34.

Similarly, the signal portion of connector 32 is coupled to one end of the primary winding of a second transformer, $T_2$, while the ground connection of connector 32 is coupled to one end of the secondary winding of the second transformer $T_2$. The opposite ends of the windings of transformer $T_2$ are coupled to the appropriate pins (6 and 3) of the modular jack. In like manner, the signal portion of connector 33 is coupled to one end of the primary winding of a third transformer $T_3$, while the ground connection is coupled to one end of the secondary winding of transformer $T_3$. The opposite ends of the windings of transformer $T_3$ are also coupled to the appropriate pins (2 and 1) of the modular jack 34. As previously mentioned, pins 4 and 5 of the modular jack are not employed in this embodiment.

The transformers $T_1$-$T_3$ have certain characteristics to minimize crosstalk among the color components and to filter out common mode signals. A high balance is needed between the two windings of the transformers. In particular, a common mode rejection greater than 40 dB for frequencies up to 50 MHz is desirable. This high balance can be achieved, for example, by using a "bifilar" winding arrangement where both primary and secondary windings are wound side-by-side around a magnetic core. Such a winding minimizes leakage inductance and DC resistance differences between windings. Highly balanced transformers $T_1$-$T_3$ will minimize crosstalk and radiated emissions resulting therefrom and from signals induced by external sources. The radiated emissions using these transformers were less than 32 dB$\mu$V/m.

A flat frequency response for each transformer is also desirable to accurately reproduce the video at the output port 34 of the adapter. It is, therefore, recommended that the frequency response of the video transformer be within ±0.5 dB in the DC to 30 MHz frequency range. It is further desirable for the transformers to exhibit low loss to ensure that the video signals are not unduly attenuated. A loss of no greater than 0.5 dB is desirable. In order to achieve such losses, a magnetic core material with a high permeability is recommended for each transformer. In this example a permeability of 20,000 was used, but in general a permeability of greater than 10,000 is desirable.

In addition to transformer characteristics, consideration should also be given to which twisted pair in the cable (40 of FIG. 1 ) is coupled to the color components. That is, by an appropriate choice of the pins (1-8) coupled to the connectors 31-33, phase delay differences between the color components can be minimized.

The four unshielded twisted pairs in a standard cable, 40, include four different twist lengths, each exhibiting a different phase delay. Best results are obtained by taking an average phase delay for the four wire pairs coupled to the pins (1-8) at a particular frequency (e.g., 1 MHz) and choosing for coupling to the transformers the 3 wire pairs which exhibit a phase delay no more than 3 percent from the average. By not using pins 4 and 5 in the adapter according to the invention, therefore, the color components will be coupled to wire pairs which are most closely matched according to phase delays. Thus, transmission characteristics are improved over adapters which do not take into account this matching of color components to twisted wire pairs.

The physical design of the adapter can be similar to that shown in U.S. patent application of W. H. Georger, Ser. No. 07/943,664 filed, Sep. 11, 1992, which is incorporated by reference herein.

Various modifications of the invention will become apparent to those skilled in the art. All such variations which basically rely on the teachings through which the invention has advanced the art are properly considered within the scope of the invention.

I claim:

1. A device for applying separate color components of a video baseband signal onto separate twisted pairs of wires comprising:
   a plurality of first ports, each adapted for coupling to a separate one of the color components;
   a plurality of transformers each electrically coupled to a corresponding port, each transformer having a common mode rejection greater than 40 dB for frequencies up to 50 MHz; and
   a second port electrically coupled to each transformer, the said second port including means for electrically connecting each transformer to a separate twisted pair of wires.

2. The device according to claim 1 wherein each transformer has a bifilar winding arrangement.

3. The device according to claim 1 wherein radiated emissions are less than 32 dB$\mu$V/m.

4. The device according to claim 1 wherein the frequency response of each transformer is within +0.5 dB in the DC to 30 MHz frequency range.

5. The device according to claim 1 wherein each transformer includes a magnetic core with a permeability of greater than 10,000.

6. The device according to claim 1 wherein the means for electrically connecting the transformers to a separate twisted pair comprises a modular jack with separate pairs of pins coupled to each transformer and a further pair of pins not coupled to any transformer.

7. The device according to claim 6 wherein wire pairs to be coupled to the second port have a certain average phase delay and the pins coupled to the transformers are adapted for coupling to twisted pairs having a deviation in phase delay from the average which is no more than 3 percent.

* * * * *